United States Patent [19]

Anderson

[11] 3,988,977
[45] Nov. 2, 1976

[54] TWINE FEED AND CUTTING MECHANISM FOR A BALER

[75] Inventor: Walter Anderson, Memphis, Tenn.

[73] Assignee: International Harvester Company, Chicago, Ill.

[22] Filed: Nov. 11, 1974

[21] Appl. No.: 522,671

[52] U.S. Cl. .................................... 100/5; 100/88
[51] Int. Cl.² ........................................ B65B 13/18
[58] Field of Search ............. 100/5, 13, 88; 56/341, 56/342, 343

[56] References Cited
UNITED STATES PATENTS

| | | | |
|---|---|---|---|
| 2,336,491 | 12/1943 | Luebben | 100/5 |
| 2,424,821 | 7/1947 | Harrer | 100/5 |
| 2,468,641 | 4/1949 | Scranton et al. | 100/5 |
| 2,627,223 | 2/1953 | Berge | 100/88 |
| 2,667,729 | 2/1954 | Harrer | 100/88 |
| 2,826,985 | 3/1958 | Harrer | 100/5 |
| 3,064,556 | 11/1962 | Luebben | 100/5 |
| 3,884,138 | 5/1975 | Rice | 100/5 |
| 3,910,178 | 10/1975 | Eggers | 100/5 |
| 3,913,473 | 10/1975 | Meiers | 100/5 |

*Primary Examiner*—Billy J. Wilhite
*Attorney, Agent, or Firm*—Neal C. Johnson; Floyd B. Harman

[57] ABSTRACT

A hay baler for picking up windrowed hay, forming a cylindrical bale, feeding twine onto the bale during the latter stage of bale formation, and cutting the twine after the bale is wrapped. The hay is picked up and fed rearwardly under a press roller onto an endless belt. A plurality of oppositely running belts is disposed above the lower belt defining a bale-forming zone there-between. The twine extends from a source of supply on the baler through an elongated twine feed tube. The tube is pivotally mounted such that its dispensing end is swingable through an arc above the incoming hay to and from a home position for feeding twine into the hay and around the bale. As the tube is swung back toward the home position a twine hook is actuated through an interconnected linkage and the twine is pulled downwardly onto a fixed knife which severs the twine.

11 Claims, 5 Drawing Figures

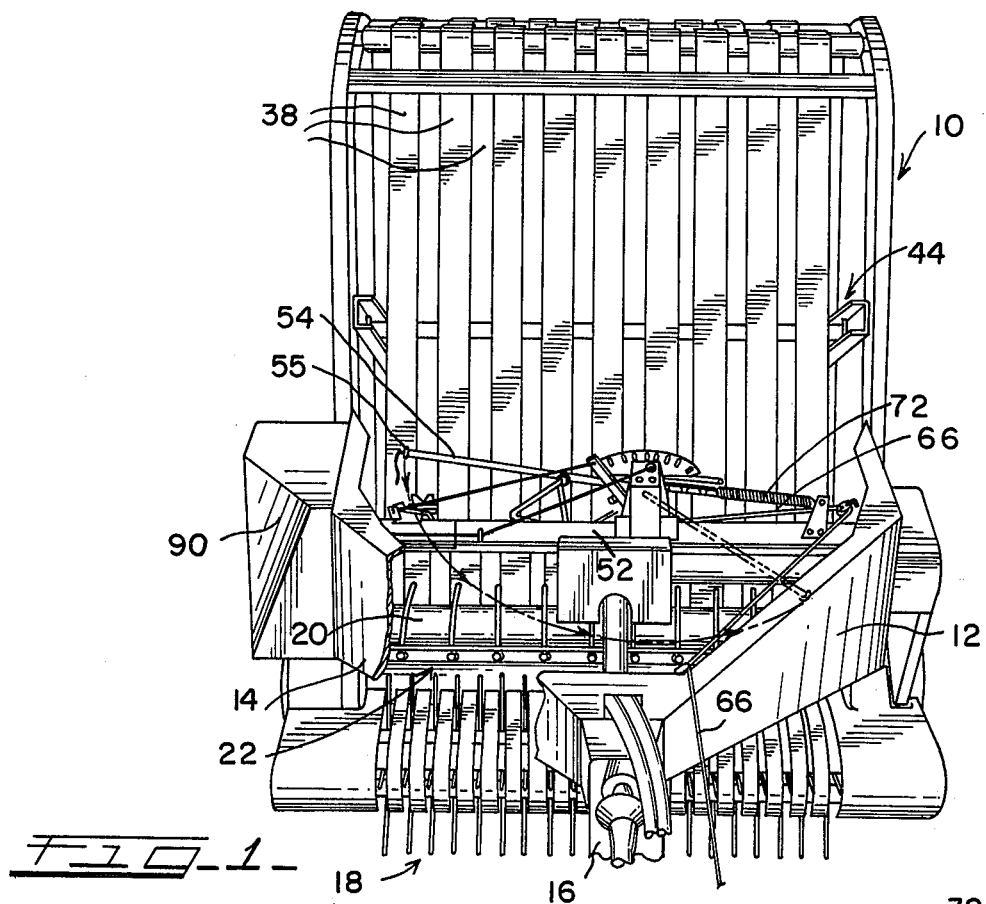
FIG_1
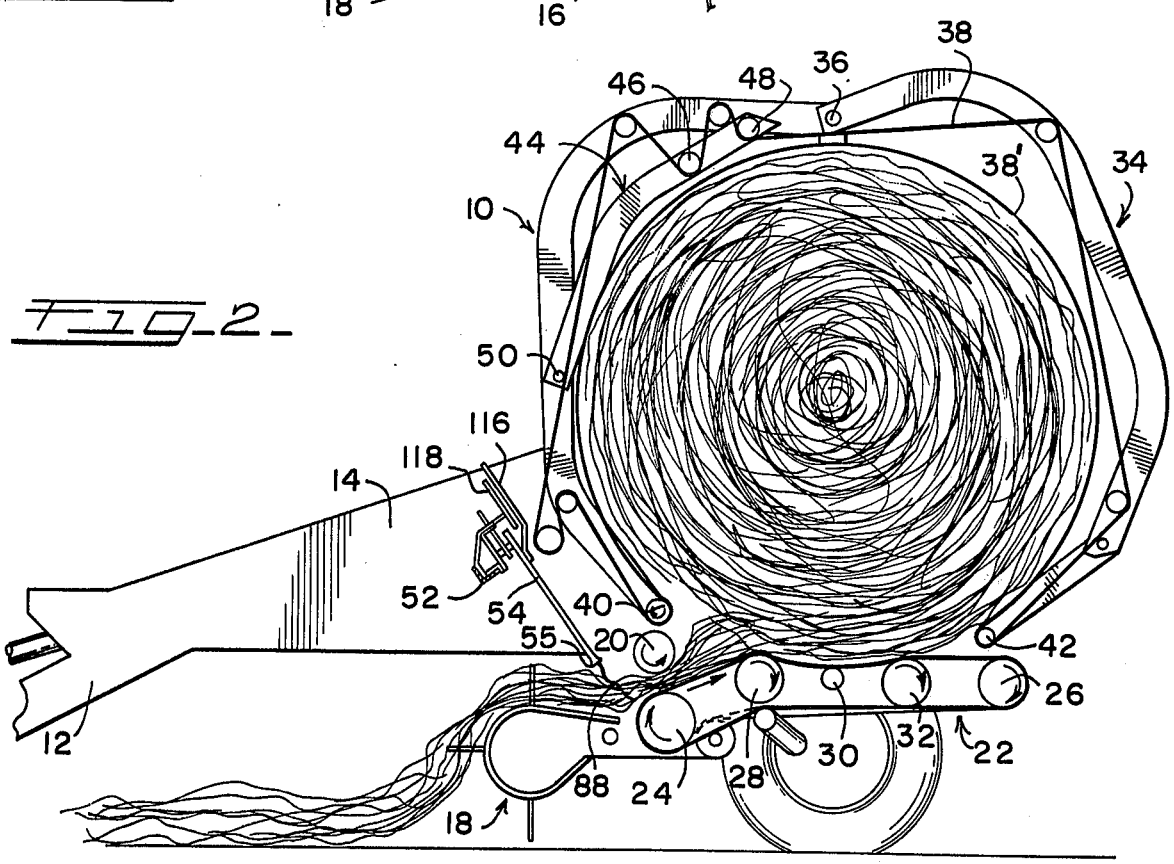
FIG_2

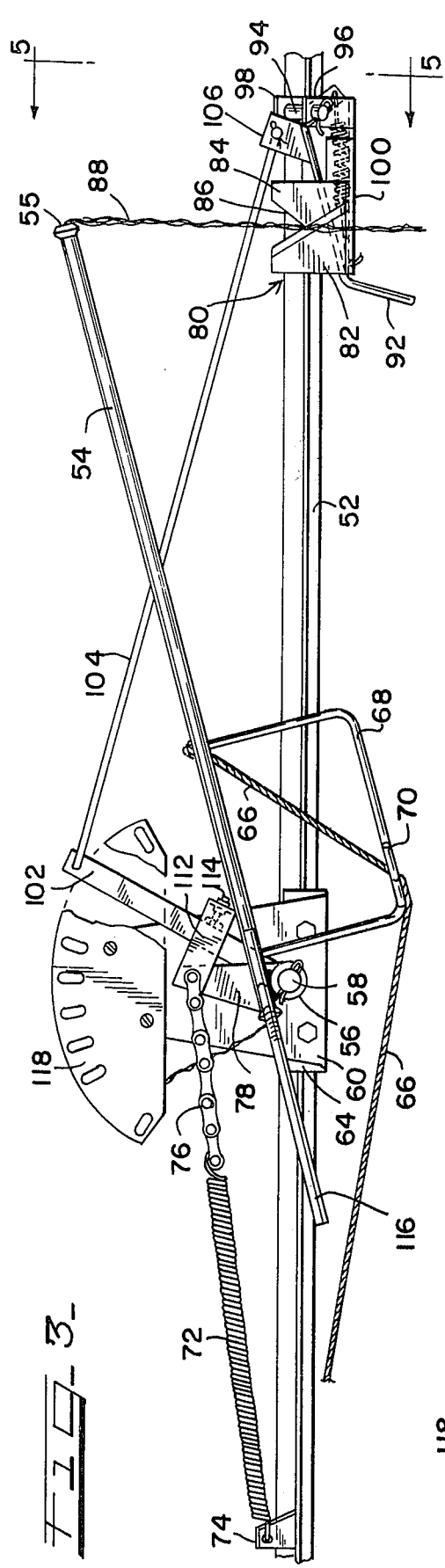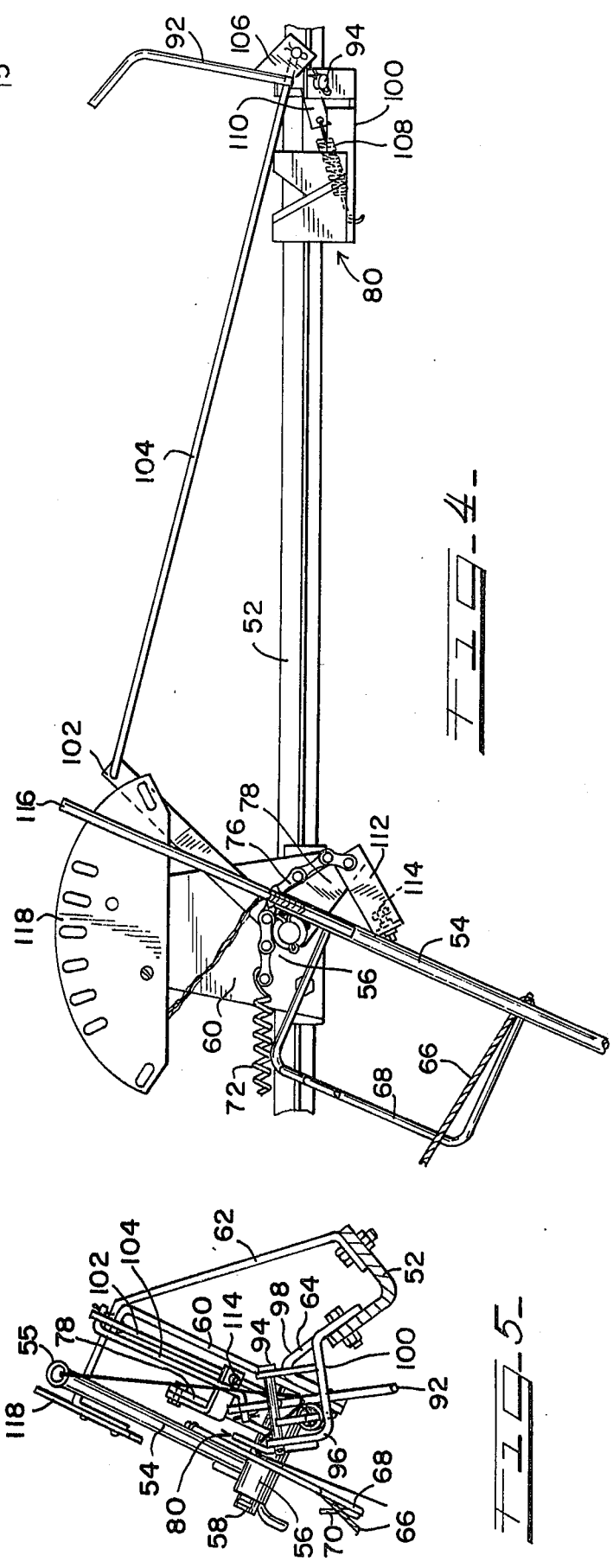

TWINE FEED AND CUTTING MECHANISM FOR A BALER

BACKGROUND OF THE INVENTION

1. Field of the Invention

The invention relates generally to balers for forming cylindrical bales and more particularly to an improved twine feeding and cutting mechanism for dispensing twine onto a bale being formed and cutting the twine after the bale has been wrapped.

2. Prior Art:

U.S. Pat. Nos. 2,826,985, 2,667,729, 2,424,821, and 2,468,641 exemplify a twine wrapping and cutting system for cylindrical bales well known in the prior art. In essence the system includes a knife, a twine feed tube, a guard interposed between the knife and the twine depending from the tube, and a mechanism interconnected between the twine feed tube and the guard for swinging the guard away from the knife to permit the twine to snap against the knife for cutting at an appropriate time in the baling cycle. It is readily apparent that this system, though perhaps ingenious, is rather complex particularly in the mechanism interconnected between the twine tube and the knife guard for moving the guard as the twine tube moves to a given position. The costs are high in the manufacture and assembly of systems which include a complex array of multiple parts.

In an effort to reduce overall costs other twine dispensing and cutting mechanisms have been developed which are manually actuated by the driver of the tractor towing the baler. The twine tube is swung through its dispensing arc by means of a pull rope. A second pull rope is then used to actuate a knife in cutting the twine. Such "two-rope" systems are cumbersome at best.

SUMMARY

The invention provides an improved twine-dispensing and cutting mechanism on a baler for forming cylindrical bales. The mechanism includes a twine-feed tube for dispensing twine onto the bale; a fixed knife for cutting the twine; a pivotable twine hook for pulling the twine against the knife; and a linkage interconnected between the twine tube and the twine hook for pivoting the hook to effect twine cutting in response to movement of the twine tube to a predetermined position. A functional advantage of the mechanism is that the twine is positively moved against the knife to ensure cutting at the proper time rather than being merely permitted to come into contact with a knife. An advantage from the important standpoint of cost is that the mechanism is very simple in construction and arrangement. Cost benefits are thus likely to be derived at each step of design, prototype construction, testing, manufacturing, and maintenance. A further advantage derived from the simplicity of the mechanism is that it can be actuated by a single rope accessible to the operator.

Briefly, the objects of the invention are to provide a baler with a twine-dispensing and cutting mechanism which is: simple in construction and arrangement; economical to build and maintain; and effective in positively moving the twine against the cutting knife to ensure cutting at the proper time.

BRIEF DESCRIPTION OF THE DRAWINGS

FIG. 1 is a fragmentary front elevation of a hay baler including the improved twine feed and cutting mechanism of the invention;

FIG. 2 is a schematic side elevation of the baler of FIG. 1;

FIG. 3 is an enlarged fragmentary elevation of the twine feed and cutting mechanism of the invention illustrated in the home or starting position;

FIG. 4 is a fragmentary enlarged elevation of the twine feed and cutting mechanism illustrating the position of the components during the twine dispensing operation; and FIG. 5 is a sectional view of the mechanism taken along the lines 5—5 of FIG. 3.

DESCRIPTION OF THE PREFERRED EMBODIMENT

Referring first to FIGS. 1 and 2 there is shown a hay baler having a wheel-supported framework 10 including a pair of forwardly converging frame members 12 and 14 connected to a draft tongue 16 adapted to be coupled to a towing tractor. The baler includes a pickup 18 for lifting windrowed hay from the ground and conveying it rearwardly beneath a press roller 20 and onto an endless belt 22 disposed across the width of the baler. Details of the structure for forming a bale are shown in Assignee's copending application Ser. No. 506,480 filed Sept. 16, 1974. Accordingly, the baling structure of the present application will be merely generally summarized with reference to FIGS. 1 and 2.

The belt 22 is trained about a forward drive roller 24 and a rearward roller 26 and is driven such that the upper load-supporting run of the belt moves rearwardly. Intermediate support rollers for the belt 22 are shown at 28, 30, and 32.

A rearwardly opening gate structure 34 is pivotally connected at 36 to the framework 10, which conjointly provide a superstructure for supporting a plurality of transversely spaced belts 38 above the belt 22. The belts 38 are supported on a plurality of rollers including a drive roller 40 on the framework 10 just above the press roller 20, and a gate-mounted roller 42 proximate to the lower belt 22. The extent of the belts 38 between the framework-mounted roller 40 and the gate-mounted roller 42 is designated 38' and constitutes an upwardly expansible upper parameter of the bale-forming zone. The upper belts 38 are driven such that the belt reach 38' is moved forwardly as the belt 22 is moved rearwardly. Accordingly, incoming hay is rolled upon itself until a bale of substantial size is formed as shown schematically in FIG. 2. The baler includes a belt tightener assembly 44 having rollers 46 and 48 engaging the belts 38 to maintain belt tension about the periphery of the bale being formed. The assembly 44 pivots upwardly about a connection 50 and the gate 34 pivots rearwardly about the connection 36 as the bale size increases. Upon completion of the bale, and wrapping with twine in accordance with the invention to be described, the gate 34 is opened by hydraulic means (not shown) and the bale is ejected onto the ground by the belt 22.

The present invention provides an improved twine dispensing and cutting mechanism for a baler of the general type described above. As shown generally in FIGS. 1 and 2 the baler frame includes a cross brace 52 of right angle section secured across the baler above the pickup 18. The mechanism includes a twine feed tube 54 pivotally supported on the cross brace 52 and having a dispensing end 55 movable through an arc above the incoming hay to dispense twine into the hay and about the bale periphery in a generally spiral wrap.

As shown in greater detail in FIGS. 3, 4, and 5 the tube 54 is welded to a sleeve 56 pivotally mounted on a pin 58. The pin 58 is secured to a trapezoidal shaped plate 60 which is connected to the cross brace 52 by upper and lower brackets 62 and 64 respectively, which are bolted to the member 52 (FIG. 5). The tube 54 is swingable through the arc shown in FIG. 1 by pulling a rope 66 accessible to the tractor operator. The rope 66 is connected to the tube 54 as shown in FIG. 3 through means including a stirrup 68 fixed to the tube 54 and which includes a lip element 70. The rope 66 engages the lip element 70 to provide a moment arm through which the pulling force is effective to swing the tube 54 downwardly from the home position shown in FIGS. 1, 3, and 5. As shown generally in FIG. 1 and more specifically in FIG. 3 an elongated coil spring 72 is effective in tension to bias the twine feed tube 54 to the home position. The spring 72 is secured between a lug 74 on the cross brace 52 and a flexible chain 76 which is connected to an arm 78 welded to the sleeve 56. The purpose and function of the chain 76 is believed clear with reference to FIG. 4 wherein the chain bends or wraps about the sleeve 56 as the tube 54 is pivoted away from its home position.

The invention includes a simple and inexpensive twine-cutting knife 80 which comprises a pair of knife sections 82 and 84 supported on the cross brace 52 to provide an upwardly disposed V-shaped cutting edge 86. In practice, the knife sections 82 and 84 are bolted in place so as to be easily removable for resharpening or replacement as required.

The twine for wrapping the successive hay bales is threaded through the tube 54 and extends downwardly from the dispensing end 55 as shown at 88 in FIG. 3. In accordance with conventional practice the twine is supplied in balls (not shown) which are carried within a container such as shown at 90 in FIG. 1.

A feature of the invention is in the provision of means for automatically cutting the twine 88 upon completion of the bale-wrapping operation. As shown in detail in FIGS. 3, 4, and 5 a hook 92 is welded to a pin 94 which is journalled in a pair of standards 96 and 98. The standards 96 and 98 are secured to a plate 100 bolted to the cross brace 52 (FIG. 5). The hook 92 is positioned to engage the depending twine 88 and pull the twine rapidly downwardly over the cutting edge 86.

The hook 92 is actuated through a mechanism including an arm 102 and a rod 104. The arm 102 is pivotally mounted on the pin 58 between the sleeve 56 and the plate 60 and projects upwardly as shown. The rod 104 is connected between the end of the arm 102 and a lug 106 welded to the hook 92. As best shown in FIG. 4, a coil spring 108 is connected in tension between the plate 100 and a lug 110 welded to the pin 94. The spring 108 acts to maintain the hook 92 in the raised position shown in FIG. 4.

An L-shaped strap 112 is secured to the outer end of the arm 78 and is movable therewith about the pin 58 as the tube 54 is pivoted. A flat-headed screw 114 is adjustably mounted on the strap 112 in a position to engage the edge of the arm 102 as the tube 54 is swung toward its home position.

As shown generally in FIG. 2 and more specifically in FIGS. 3 and 4 a rod 116 is welded to the end of the twine feed tube opposite the dispensing end 55. A semicircular quadrant plate 118 is secured to the top of the bracket 62 so as to be visible to the operator from the tractor. The rod 116 is elongated to project beyond the periphery of the quadrant plate 118. Accordingly, the operator is provided with a visual indication of the position of the twine dispensing end 55 of the twine feed tube throughout its arc of movement.

The operation of the twine dispensing and cutting mechanism will be briefly summarized. As the hay bale closely approaches the desired maximum size the rope 66 is pulled to swing the twine feed tube 54 downwardly from its home position. The depending twine 88 (FIG. 2) is caught by the hay being conveyed rearwardly and is wrapped onto the bale as it is rotated by the oppositely moving belts. The tube 54 is swung through the arc completely to the right as seen in FIG. 1 by continuing to pull the rope 66. Tension on the rope is then gradually released and the tube swings to the left under the force of the spring 72. During this process the twine feeds out and wraps spirally onto the bale. The operator can control the speed of movement of the tube thereby controlling the amount of twine wrapped onto the bale. The position and speed of movement of the rod 116 relative to the quadrant plate 118 provides the operator with a visual indication of the position and speed of movement of the dispensing end 55 of the tube 54.

During this above described movement of the tube 54 the hook 92 is retained in a raised position by the spring 108 as shown in FIG. 4. As the tube approaches the home position of FIGS. 1 and 3 the bolt 114 is moved into contact with the arm 102 which pivots to the left (FIG. 3) about the pin 58. This movement shifts the rod 104 to the left which swings the hook 92 downwardly in a rapid stroke. The twine 88 is engaged by the downwardly moving hook 92 and is pulled downwardly over the cutting edge 86 of the knife 80. FIG. 5 illustrates the relatively sharp angle at which the twine is disposed across the knife 80 at the full downward stroke of the hook 92. Since the twine is moving, the rapid movement against the cutting edge effected by the hook 92 results in a positive severing of the twine.

By the foregoing Applicant has provided a twine dispensing and cutting mechanism well suited to achieve the aforestated objects of the invention.

What is claimed is:

1. In a baler adapted for forming twine-wrapped cylindrical bales, an improved twine-dispensing and cutting mechanism, comprising:

a twine dispenser pivotally mounted on the baler and having a dispensing end swingable to and from a home position wherein the twine depends downwardly therefrom;

a knife mounted on the baler proximate to the twine depending from said dispensing end when in said home position;

a twine engaging element pivotally mounted on the baler for pulling the twine against said knife to cut the same;

and means linking said twine dispenser and said element for pivoting said element to effect cutting of the twine in response to movement of said dispenser to its home position.

2. The subject matter of claim 1, including spring means operative on said twine engaging element for biasing said element out of contact with the twine.

3. The subject matter of claim 1, wherein said knife includes an upwardly projecting cutting edge, and means pivotally mounting said twine-engaging element for movement pulling the twine downwardly onto said cutting edge.

4. In a baler adapted for forming twine-wrapped cylindrical bales, an improved twine dispensing and cutting mechanism, comprising:
    a twine feed tube pivotally mounted on the baler and having a dispensing end swingable to and from a home position wherein the twine depends downwardly therefrom;
    a knife mounted on the baler proximate to the twine depending from said dispensing end when in said home position;
    a twine hook pivotally mounted on the baler for pulling the twine against said knife to cut the same;
    and means linking said twine feed tube and said hook for pivoting said hook to effect cutting of the twine in response to movement of said tube to its home position.

5. The subject matter of claim 4, including spring means operative on said twine hook for biasing said hook out of contact with the twine.

6. The subject matter of claim 4, wherein said knife includes an upwardly projecting cutting edge, and means pivotally mounting said hook for movement pulling the twine downwardly onto said cutting edge.

7. The subject matter of claim 4, wherein said knife is disposed below the twine depending from said tube end in its home position, said hook including an elongated twine-engaging element pivotable downwardly to pull the twine against said knife.

8. In a baler including means for conveying hay rearwardly into a zone wherein a cylindrical bale is formed, an improved system for wrapping the bale with twine and cutting the twine after wrapping, comprising:
    a twine feed tube pivotally mounted on the baler and having a dispensing end swingable in an arc above said conveying means forwardly of said zone to and from a home position for feeding twine into the hay being conveyed into the zone for wrapping onto the bale being formed;
    twine cutting means on the baler proximate to the twine being fed from said dispensing end when in said home position;
    and means responsive to movement of said twine tube to said home position for shifting the twine against said cutting means, thereby severing the twine.

9. The subject matter of claim 8, wherein said twine cutting means includes a fixed knife having an edge against which the twine is cut.

10. In a baler including means for conveying hay rearwardly into a zone wherein a cylindrical bale is formed, and further including frame structure disposed above the conveying means, an improved mechanism for dispensing twine onto a bale being formed and cutting the twine, comprising:
    a twine feed tube pivotally mounted on said frame structure and having a twine-dispensing end swingable in an arc forwardly of said zone to and from a home position for feeding twine into the hay being conveyed into the zone for wrapping onto the bale being formed;
    a twine cutting knife fixed on said frame structure proximate to the twine dispensed from said dispensing end when in said home position;
    a twine-engageable hook pivotally mounted on said frame structure for actuation in a twine-pulling stroke to pull the twine over said knife to cut the twine;
    an arm pivotally mounted on said frame structure coaxially with said twine feed tube;
    a rod connected between said arm and said hook for pivoting said hook through said twine-pulling stroke in response to pivotal movement of said arm;
    and means operatively interconnecting said tube and said arm for conjoint pivoting movement in response to movement of said tube into its home position, whereby the twine is automatically severed.

11. The subject matter of claim 10, including a spring connected between said hook and said frame structure biasing said hook pivotally away from engagement with the twine.

* * * * *